United States Patent [19]
Veltman et al.

[11] Patent Number: 5,386,234
[45] Date of Patent: Jan. 31, 1995

[54] INTERFRAME MOTION PREDICTING METHOD AND PICTURE SIGNAL CODING/DECODING APPARATUS

[75] Inventors: Markus H. Veltman; Ryuichi Iwamura, both of Tokyo, Japan

[73] Assignee: Sony Corporation, Japan

[21] Appl. No.: 972,315

[22] Filed: Nov. 5, 1992

[30] Foreign Application Priority Data

Nov. 13, 1991 [JP] Japan .................. 3-297431

[51] Int. Cl.⁶ ............... H04N 7/133; H04N 7/137
[52] U.S. Cl. .................... 348/409; 348/412; 348/413; 348/415; 348/416
[58] Field of Search .............. 358/136, 135, 133; 348/384, 390, 394, 409, 412, 415, 413, 416; H04N 7/133, 7/137

[56] References Cited

U.S. PATENT DOCUMENTS

| | | | |
|---|---|---|---|
| 4,651,206 | 3/1987 | Ohki | 358/136 |
| 4,837,618 | 6/1989 | Hatori | 358/135 |
| 4,853,780 | 8/1989 | Kojima et al. | 358/136 |
| 4,985,768 | 1/1991 | Sugiyama | 358/136 |
| 4,987,490 | 1/1991 | Ohta | 358/136 |
| 4,999,705 | 3/1991 | Puri | 358/136 |
| 5,038,209 | 8/1991 | Hang | 358/136 |
| 5,057,918 | 10/1991 | Dennoyelle et al. | 358/136 |
| 5,079,630 | 1/1992 | Golin et al. | 358/133 |
| 5,089,888 | 2/1992 | Zdepski et al. | 358/133 |
| 5,089,889 | 2/1992 | Sugiyama | 358/136 |
| 5,111,294 | 5/1992 | Asai et al. | 358/136 |
| 5,134,478 | 7/1992 | Golin | 358/136 |
| 5,136,378 | 8/1992 | Tsurube | 358/136 |
| 5,144,426 | 9/1992 | Tanaka et al. | 358/136 |
| 5,150,432 | 9/1992 | Ueno et al. | 382/56 |
| 5,155,593 | 10/1992 | Yonemitsu et al. | 358/136 |

FOREIGN PATENT DOCUMENTS

| | | | |
|---|---|---|---|
| 0424026A2 | 4/1991 | European Pat. Off. | H04N 7/137 |
| 0443676A1 | 8/1991 | European Pat. Off. | H04N 5/92 |

OTHER PUBLICATIONS

Coded Representation of Picture and Audio Information 1991, Nov., Toshinori Odaka, Hideyuki Ueno et al.

Primary Examiner—Tommy P. Chin
Assistant Examiner—Vu Le
Attorney, Agent, or Firm—Limbach & Limbach; Charles P. Sammut

[57] ABSTRACT

An interframe motion predicting method for prediction of the motion in a bidirectionally predictive-coded frame from an intra-coded frame and a predictive-coded frame, predicts the motion in another bidirectionally predictive-coded frame from the preceding bidirectionally predictive-coded frame and the predictive-coded frame. A picture signal coding apparatus executes orthogonal transformation of a picture signal, then quantizes the transformed data, and codes the data thus quantized. The apparatus includes a local decoder for the quantized data; first and second memories for storing the decoded picture data of an intra-coded or bidirectionally predictive-coded frame, and a predictive-coded frame respectively; a predictive picture generator for generating a predictive picture of a second bidirectionally predictive-coded frame; and a difference calculator for calculating the difference between the predictive picture and the original picture signal corresponding thereto. A picture signal decoding apparatus includes inverse multiplexer for separating the coded data into interframe predictive error data and vector coded data; a decoder for generating decoded picture data on the basis of such error data; first and second memories for storing the decoded picture data of the intra-coded frame and the predictive-coded frame respectively; a predictive picture generator for generating a predicted picture of a second bidirectionally predictive-coded frame; and a frame switching selector for selectively rearranging the decoded picture data in the order of reproduction.

10 Claims, 7 Drawing Sheets

INTERFRAME MOTION PREDICTING METHOD AND PICTURE SIGNAL CODING/DECODING APPARATUS

REFERENCE TO PRIORITY APPLICATION

Foreign priority benefits under 35 U.S.C. S119 are claimed under Japanese application P3-297431, filed Nov. 13, 1991.

BACKGROUND OF THE INVENTION

1. Field of the Invention

The present invention relates to an interframe motion predicting method concerned with moving pictures, and also to a picture signal coding/decoding apparatus based particularly on the MPEG (moving picture experts group) system.

2. Description of the Prior Art

A conventional interframe motion predicting method based on the MPEG system will be described below with reference to FIG. 7.

In this diagram, first a predictive-coded frame P0 is predicted from an intra-coded frame I0. Subsequently a bidirectionally predictive-coded frame B0 is predicted from the two frames I0 and P0. Similarly another bidirectionally predictive-coded frame B1 is predicted from the intra-coded frame I0 and the predictive-coded frame P0.

For prediction of the bidirectionally predictive-coded frames B0 and B1, there are known three modes such as forward prediction from the predictive-coded frame P0, backward prediction from the intra-coded frame I0, and interpolative prediction executed bidirectionally as mentioned above. In practice, the most adequate one for data compression is selected out of such three modes.

In the illustration of FIG. 7, two bidirectionally predictive-coded frames B0 and B1 are existent between the frames I0 and P0. However, desired prediction can be performed by the same method even in the case where there are three or more bidirectionally predictive-coded frames between the frames I0 and P0.

When two or more bidirectionally predictive-coded frames are existent between the frames I0 and P0 as described, the precision of motion prediction relative to the bidirectionally predictive-coded frame B temporally apart from the frame I0 or P0 is lowered in accordance with the time difference therebetween, and such precision is deteriorated particularly with a rise in the degree of the motion.

OBJECT AND SUMMARY OF THE INVENTION

It is an object of the present invention to provide an improved interframe motion predicting method which is capable of enhancing the precision in the prediction of the motion in any bidirectionally predictive-coded frame to consequently raise the efficiency in compressing the moving picture data.

According to a first aspect of the present invention, provided is an improvement in an interframe motion predicting method for prediction of the motion in a bidirectionally predictive-coded frame from an intra-coded frame and a predictive-coded frame. The improvement predicts the motion in another bidirectionally predictive-coded frame from the first-mentioned bidirectionally predictive-coded frame and the predictive-coded frame.

When three or more bidirectionally predictive-coded frames are existent between the intra-coded frame and the predictive-coded frame, the motion in any of the bidirectionally predictive-coded frames other than the first one is predicted from the preceding adjacent bidirectionally predictive-coded frame and the predictive-coded frame.

In a modification of such method, the motion in a bidirectionally predictive-coded frame other than the first one is predicted on the additional basis of the intra-coded frame as well.

According to a second aspect of the present invention, Provided is a picture signal coding apparatus capable of executing orthogonal transformation of a picture signal where each of the block groups consists of a plurality of individual blocks, quantizing the transformed data, and coding the quantized data. The apparatus comprises a local decoder for locally decoding the quantized data; a first memory for storing the decoded picture data obtained by locally decoding an intra-coded frame or a bidirectionally predictive-coded frame; a second memory for storing the decoded picture data obtained by locally decoding the predictive-coded frame; a predictive picture generator for generating a predictive picture of the other bidirectionally predictive-coded frame from the decoded picture data obtained by locally decoding the one bidirectionally predictive-coded frame and also from the decoded picture data obtained by locally decoding the predictive-coded frame; and a subtracter for calculating the difference between the predictive picture formed by the predictive picture generator and the original picture signal corresponding to such predictive picture.

According to a third aspect of the present invention, provided is a picture signal coding apparatus capable of executing an orthogonal transformation of a picture signal where each of the block groups consists of a plurality of unitary blocks, then quantizing the transformed data, and coding the data thus quantized. This apparatus comprises a local decoder for locally decoding the quantized data; a first memory for storing the decoded picture data obtained by locally decoding an intra-coded frame; a second memory for storing the decoded picture data obtained by locally decoding a predictive-coded frame; a third memory for storing the decoded picture data obtained by locally decoding one bidirectionally predictive-coded frame; a predictive picture generator for generating a predictive picture of the other bidirectionally predictive-coded frame from the decoded picture data obtained by locally decoding the intra-coded frame, the decoded picture data obtained by locally decoding the said one bidirectionally predictive-coded frame, and also from the decoded picture data obtained by locally decoding the predictive-coded frame; and a subtracter for calculating the difference between the predictive picture formed by the predictive picture generator and the original picture signal corresponding to such predictive picture. In the picture signal coding apparatus mentioned, the local decoder comprises an inverse quantizer for inversely quantizing the quantized data, and an inverse orthogonal transformer for executing an inverse orthogonal transformation of the inversely quantized data.

According to a fourth aspect of the present invention, Provided is a picture signal decoding apparatus comprising: an inverse multiplexer for separating the coded data into interframe predictive error data and vector coded data; a decoder for generating decoded picture data on the basis of the interframe predictive error data; a first memory for storing the decoded picture data of the intra-coded frame; a second memory for storing the decoded picture data of the predictive-coded frame; a predictive picture generator for generating a predictive picture of the other bidirectionally predictive-coded frame from both the decoded picture data of one bidirectionally predictive-coded frame and the decoded picture data of the predictive-coded frame; and a frame switching selector for selectively rearranging the decoded picture data in the order of reproduction and outputting the rearranged data.

According to a fifth aspect of the present invention, Provided is a picture signal decoding apparatus comprising: an inverse multiplexer for separating the coded data into interframe predictive error data and vector coded data; a decoder for generating decoded picture data on the basis of the interframe predictive error data; a first memory for storing the decoded picture data of the intra-coded frame; a second memory for storing the decoded picture data of the predictive-coded frame; a third memory for storing the decoded picture data of one bidirectionally predictive-coded frame from the decoded picture data of the intra-coded frame, the decoded picture data of the said one bidirectionally predictive-coded frame, and the decoded picture data of the predictive-coded frame; and a frame switching selector for selectively rearranging the decoded picture data in the order of reproduction and outputting the rearranged data.

In the picture signal decoding apparatus mentioned, the decoder generates a predictive picture from the decoded picture data obtained by adding the interframe predictive error data to the predictive picture data outputted from the predictive picture generator.

Thus, in the interframe motion predicting method of the present invention, the motion in the other bidirectionally predictive-coded frame is predicted from one bidirectionally predictive-coded frame and the predictive-coded frame, or from one bidirectionally predictive-coded frame, the predictive-coded frame and the intra-coded frame.

The above and other features and advantages of the present invention will become apparent from the following description which will be given with reference to the illustrative accompanying drawings.

BRIEF DESCRIPTION OF THE DRAWINGS

FIGS. 3A through 3G are timing charts of signals for explaining in detail the method of FIGS. 1A and 1B;

FIG. 6A through 6H are timing charts of signals for explaining in detail the method of FIG. 1C.

DESCRIPTION OF THE PREFERRED EMBODIMENTS

Hereinafter exemplary embodiments of the interframe motion predicting method of the present invention will be described in detail with reference to the accompanying drawings.

Figure 2:
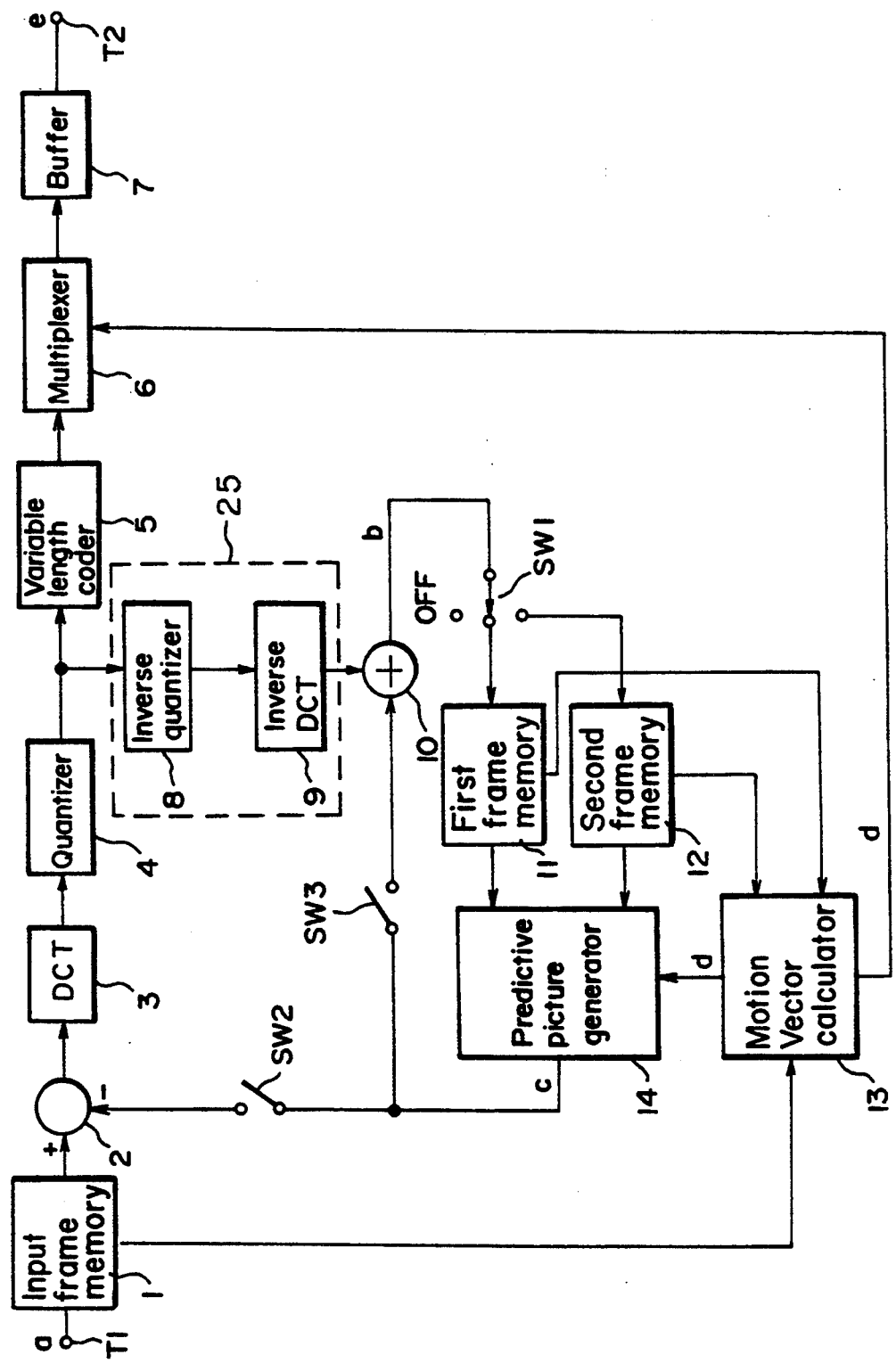
FIG. 2 is a block diagram of a coding apparatus to which the method of FIGS. 1A and 1B is applied.

FIG. 2 is a block diagram of a coding apparatus where the method of the present invention is applied. This coding apparatus is equipped with a combination of a DCT (discrete cosine transformer) and an interframe predictor.

Figure 3A:
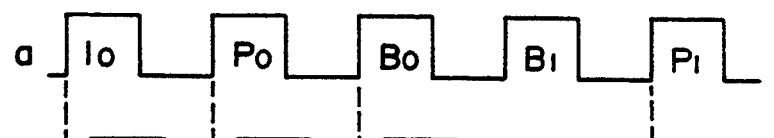

To a video input terminal T1 shown in FIG. 2, picture frames I0, B0, B1, P0, B2, B3 and P1 in the respective order are sequentially inputted. Such picture frames a illustrated in FIG. 2 are rearranged in a input frame memory 1 in the specified above order to be encoded, and then are supplied to a subtracter 2 as picture frames a (FIG. 3A). The subtracter 2 computes an inter-frame prediction error difference between the picture frame a and the predictive picture data from the predictive picture generator. Subsequently, the interframe predictive error is quantized and Discrete Cosine Transformed (DCT) and is subjected to two different paths, one to a variable length coder 5, and the other a decoder 25 which includes an inverse quantizer 8 and an inverse DCT 9. Data output from the variable length coder 5 is multiplexed with vector data in a multiplexer 6. Output from the multiplexer 6 is buffered by a buffer 7 and provided to an output terminal T2. Data from the output of the inverse quantizer 8 is processed by the inverse DCT 9. The output of the inverse DCT 9 is added, as detailed further herein, within an adder 10 to produce decode picture data b, as represented in FIG. 3B.

The decoded picture data b is inputted via a first frame memory selector switch SW1 to a frame memory 11 or a second frame memory 12.

A motion vector calculator 13 generates a motion vector from the data inputted from the frame memory 1, 11 or 12.

A predictive picture generator 14 generates predictive picture data c from the motion vector data obtained by the motion vector calculator 13 and also from the picture data stored in the frame memory 11 or second frame memory 12.

The predictive picture data c is inputted via a switch SW2 to the negative terminal of the subtracter 2 while being inputted also to the adder 10 via a switch SW3.

Now a description will be given on an embodiment of the interframe motion predicting method of the present invention with reference to FIGS. 1A and 1B.

Figure 1A:
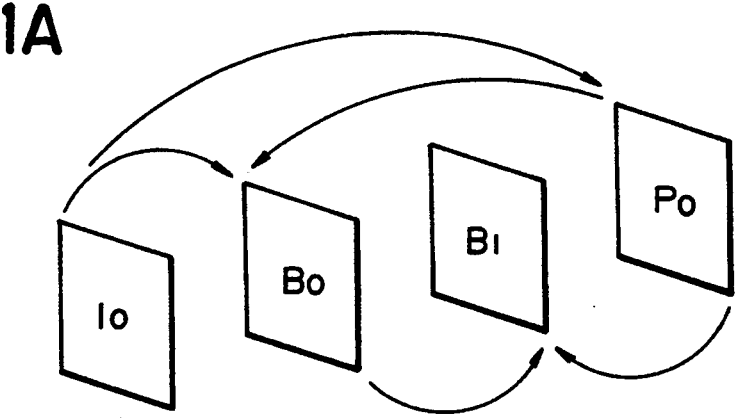
FIGS. 1A, 1B and 1C illustrate exemplary embodiments of the interframe motion predicting method according to the present invention.

In FIG. 1A, a bidirectionally predictive-coded frame B0 is predicted from an intra-coded frame I0 and a predictive-coded frame P0 as in the conventional method. However, another bidirectionally predictive-coded frame B1 is predicted from the preceding frames B0 and P0. The most adequate mode of prediction is selected out of forward prediction, backward prediction and interpolative prediction.

Figure 1B:
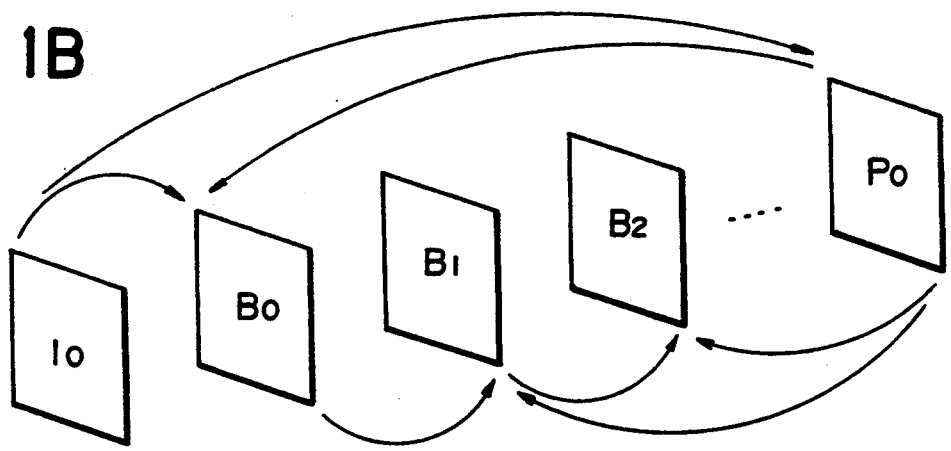

The same operation as above is performed with respect to FIG. 1B where three bidirectionally predictive-coded frames B (B0, B1, B2) or more are existent between frames I0 and P0 by interpolation. With the exception of the first frame B0, the successive frames B1, B2, ... are predicted from the respective preceding adjacent frames B0, B1, ... and the frame P0.

Thus, prediction from each preceding adjacent bidirectionally predictive-coded frame can be performed to enhance the precision of prediction in comparison with the known method that executes prediction from the intra-coded frame I0 temporally apart from the relevant bidirectionally predictive-coded frame, hence further raising the efficiency in compression of the picture data. Particularly in any picture with great motion, the precision of prediction relative to the bidirectionally predictive-coded frame is raised to consequently achieve a higher picture-data compression efficiency.

The above embodiment will now be explained in further detail below with reference to FIGS. 2 and 3. First a picture frame I0 shown in FIG. 3A is inputted to the subtracter 2 in the coding apparatus of FIG. 2. Subsequently the picture frame I0 is outputted from the adder 10 in the form of a decoded picture frame I0' (FIG. 3B). Since the switch SW1 is connected to the first frame memory 11 (as shown in FIG. 3D), the frame I0' is inputted to the frame memory 11 and is stored therein. At this time, the switches SW1 and SW2 are both in an off-state as shown in FIGS. 3D and 3E, so that the predictive picture data c obtained from the predictive picture generator 14 is not supplied to either the subtracter 2 or the adder 10.

Subsequently a picture frame P0 is inputted to the subtracter 2. At this time the switches SW2 and SW3 are both in an on-state, so that a predictive-coded frame P0" (FIG. 3C) predicted from the decoded picture data I0' is outputted from the predictive picture generator 14. Decoded picture data P0' shown in FIG. 3B is then generated in the adder 10 on the basis of the frames P0" and P0. At the input time of the picture frame P0, the switch SW1 is connected to the frame memory 12, so that the decoded picture data P0' is inputted to and stored in the second frame memory 12.

Figure 3C:
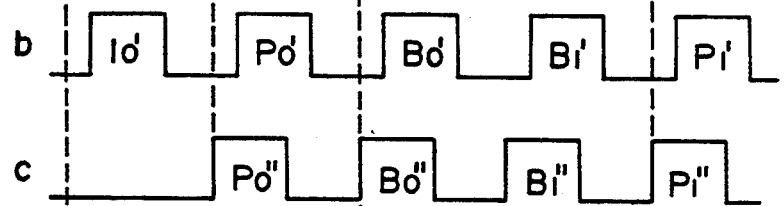
Figure 3E:
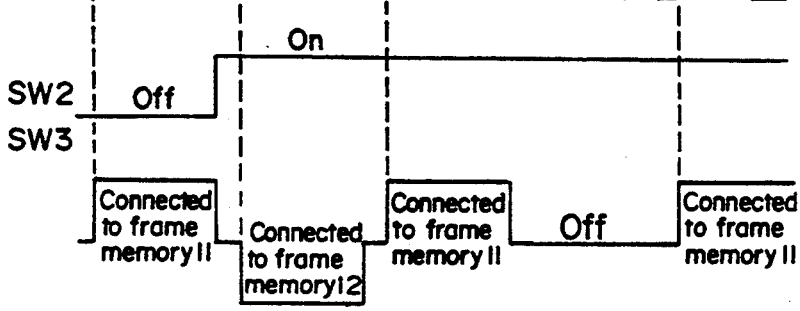

At the input time of the next picture frame B0, the predictive picture generator 14 is supplied with the data I0', P0' stored in the first and second frame memories 11, 12 and the motion vector d, and then outputs the predictive picture data B0" shown in FIG. 3C.

The adder 10 generates decoded picture data B0' from the picture frames B0 and B0". Since the switch SW1 is connected to the frame memory 11 at this time, the data B0' is inputted to and stored in the first frame memory 11.

Figure 3F:
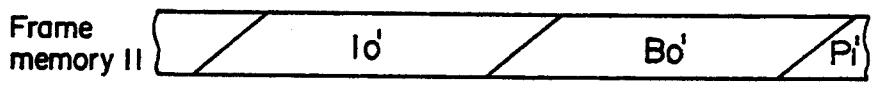
Figure 3G:

The above operation is shown in FIG. 3F. First the data I0' is stored in the first frame memory 11, and then the data B0' is stored therein. Meanwhile in the second frame memory 12, first the data P0' is stored as shown in FIG. 3G. The data P0' is continuously retained even at the instant the storage content in the first frame memory 11 has been updated from the data I0' to the data B0'.

Subsequently a picture frame B1 is inputted. At this time, the data P0' and B0' from the first and second frame memories 11, 12 have already been inputted to the predictive picture generator 14, so that predictive picture data B1" is outputted from the predictive picture generator 14, and decoded picture data B1' is produced in the adder 10 on the basis of the data B1" and the picture frame B1. Since the switch SW1 is in its off-state at this instant, the data B1' is not stored in any of the first and second frame memories 11 and 12.

The same operation as the above is performed when the next predictive-coded frame P1 is inputted. Predictive picture data P1" predicted from the data P0' (FIG. 3G) stored in the second frame memory 12 is outputted from the predictive picture generator 14, and then the adder 10 produces decoded picture data P1' from the predictive picture data P1" and the frame P1.

Subsequently, the same operation is performed with respect to unshown successive picture frames B2 and B3. Regarding the picture frame B2, predictive picture data B2" is predicted from the data P0' and P1', and decoded picture data B2' is obtained from the picture frame B2 and the data B2". Meanwhile, regarding the picture frame B3, predictive picture data B3" is predicted from the data P1' and B2', and decoded picture data B3' is obtained from the picture frame B3 and the data B3".

Figure 4:
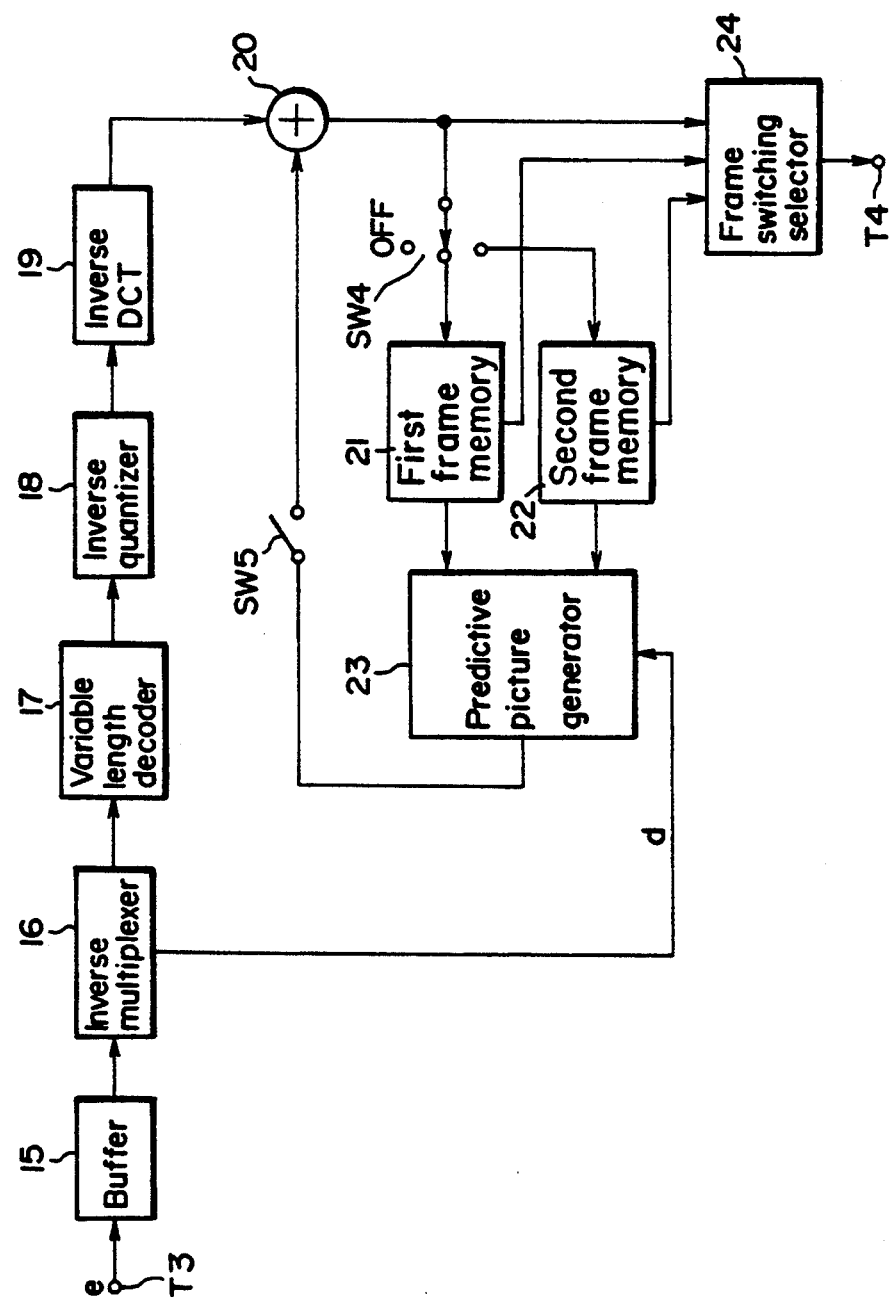
FIG. 4 is a block diagram of a decoding apparatus correlative to the coding apparatus of FIG. 2.

FIG. 4 is a block diagram of a decoding apparatus correlative to the coding apparatus shown in FIG. 2. The output signal delivered from the coding apparatus of FIG. 2 to an input terminal T3 is supplied via a buffer 15 to an inverse multiplexer 16, which then outputs inter-frame predictive error data and motion vector data processed through discrete cosine transformation and quantization.

The interframe predictive error data thus obtained is decoded by a variable length decoder 17, an inverse quantizer 18 and an inverse DCT, and then is inputted to an adder 20.

To the adder 20, there is also inputted, simultaneously with such interframe predictive error data, the predictive picture data produced by a predictive picture generator 23 on the basis of the data obtained from a first frame memory 21 and a second frame memory 22 via a switch SW5, and the input data are added to each other to become decoded picture data.

The decoded picture data is inputted to the first and second frame memory 21 or 22 to produce data for generation of desired predictive picture data while also being inputted to a frame switching selector 24.

In the frame switching selector 24, the picture frames are rearranged in the initial order of I0, B0, B1, P0, B2, B3, P1.

Figure 1C:
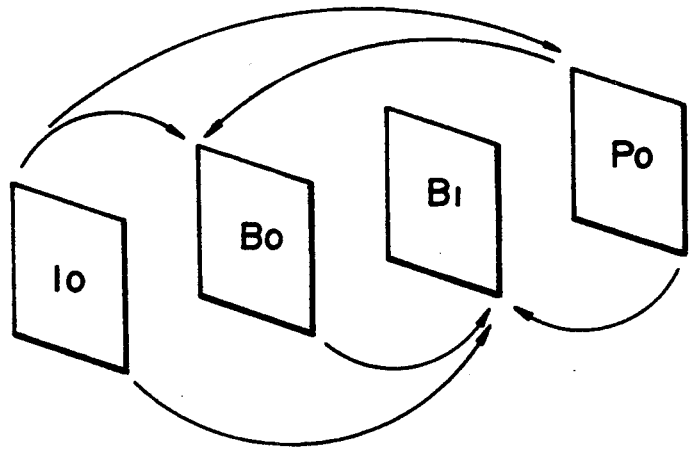

FIG. 1C illustrates a modification of the method shown in FIGS. 1A and 1B. In FIG. 1C, a bidirectionally predictive-coded frame B1 is predicted not merely from frames P0 and B0 but also from a frame I0 as well.

Figure 5:
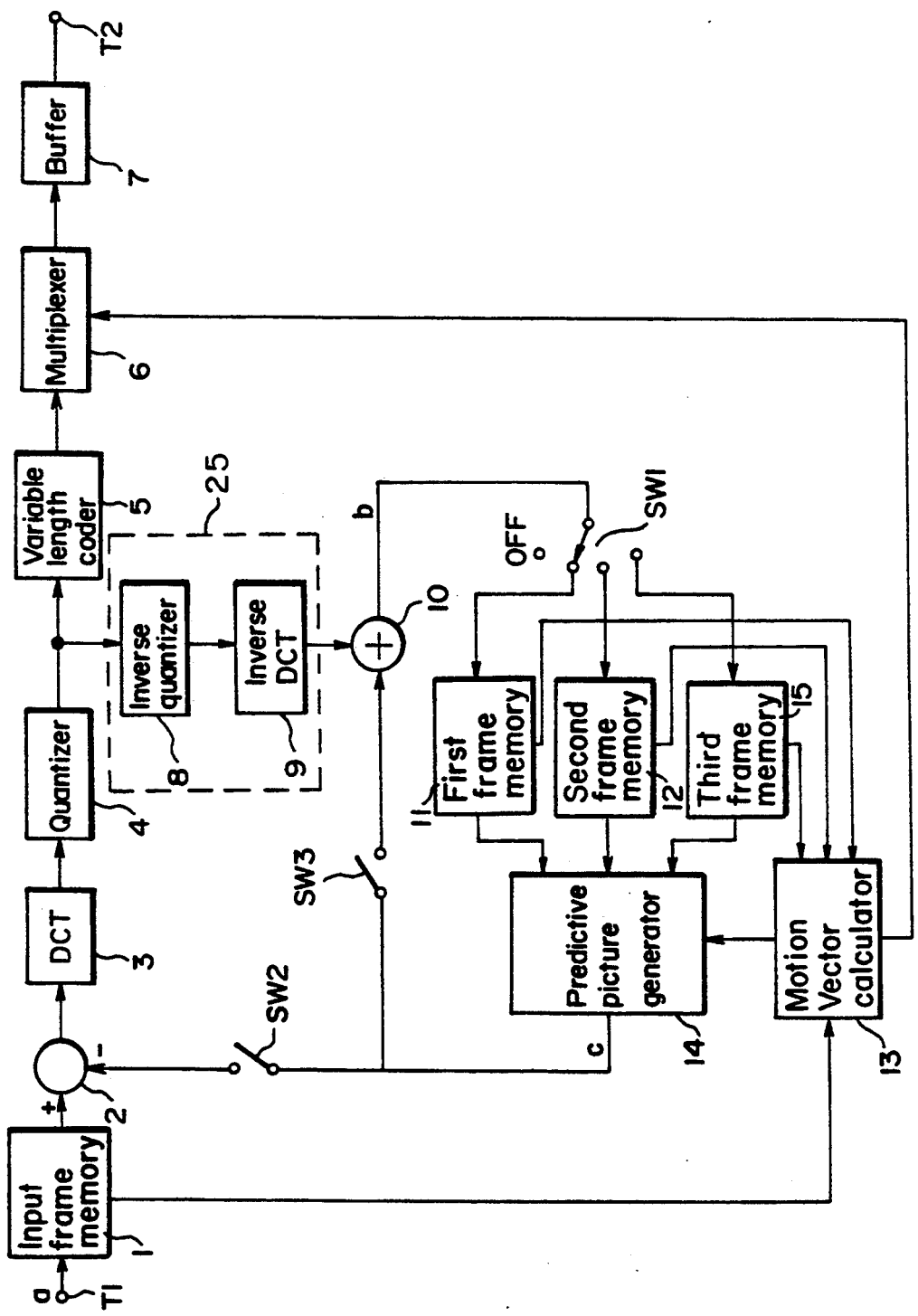
FIG. 5 is a block diagram of a coding apparatus to which the method of FIG. 1C is applied.

Hereinafter the modification of FIG. 1C will be described in detail with reference to FIGS. 5 and 6. In FIG. 5, the difference from the aforementioned embodiment of FIG. 2 resides in the additional provision of a third frame memory 15, so that a total of three frame memories are employed. Meanwhile in FIG. 6, the difference from the example of FIG. 3 resides in the connection state (FIG. 6E) of the third frame memory 15 selected by the switch-SW1, and the storage contents (FIG. 6F and H) of the first and second frame memories 11 and 15. Since any other component parts in FIGS. 5 and 6 are the same as those in FIGS. 2 and 3, a repeated explanation thereof is omitted here.

Figure 6A:
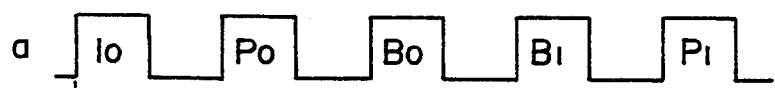
Figure 6B:
Figure 6C:
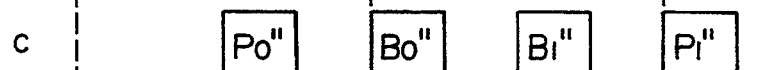
Figure 6E:
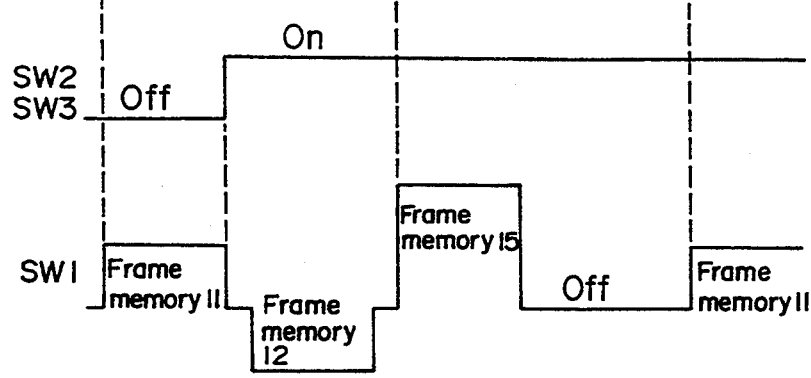
Figure 6F:
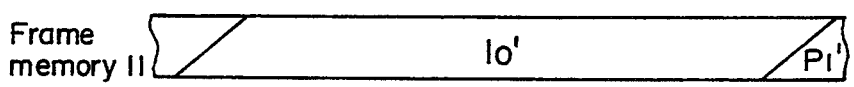
Figure 6G:
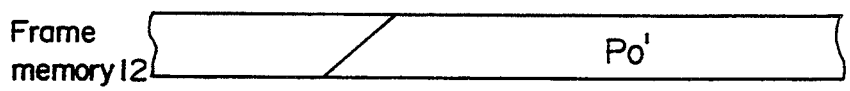
Figure 6H:
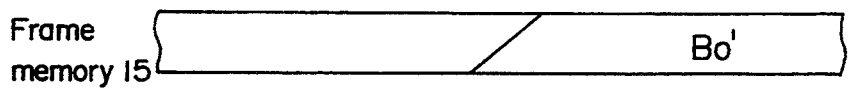
Figure 7:
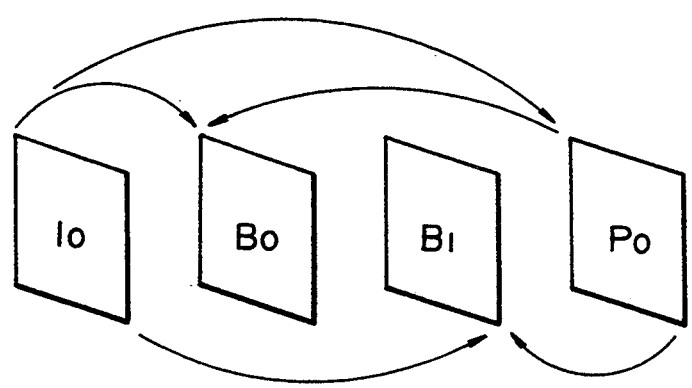
FIG. 7 illustrates a conventional interframe motion predicting method.

In response to input of a picture frame B0 shown in FIG. 6A, the switch SW1 in FIG. 6E connects the third frame memory 15 (or the frame switch 11 in FIG. 3), whereby decoded picture data B0' is stored in the third frame memory 15 as shown in FIG. 6H while the decoded picture data I0' is still stored in the first frame memory 11 continuously as shown in FIG. 6F.

Therefore it becomes possible to obtain a bidirectionally predictive-coded frame B1" from the data I0', P0' and B0' stored respectively in the first, second and third frame memories 11, 12 and 15, hence attaining a higher precision of prediction than the value in predicting the data B1" merely from the picture data P0' and B0'.

According to the interframe motion predicting method of the present invention, as described hereinabove, any motion in the other bidirectionally predictive-coded frame is predicted from one bidirectionally predictive-coded frame and a predictive-coded frame, or from one bidirectionally predictive-coded frame, a predictive-coded frame and an intra-coded frame, so that it is rendered unnecessary to use any temporally apart intra-coded frame or predictive-coded frame, hence enhancing the precision in prediction of the other bidirectionally predictive-coded frame to consequently raise the efficiency in compressing the moving picture data.

Furthermore, the method eliminates the necessity of the motion vector calculation based on any temporally apart intra-coded frame or predictive-coded frame, thereby achieving another advantage of curtailing the time required for the motion vector calculation.

What is claimed is:

1. In an interframe motion predicting method for prediction of motion in a first bidirectionally predictive-coded frame from an intra-coded frame and a predictive-coded frame the improvement comprising the step of:

predicting motion in a second bidirectionally predictive-coded frame from said first bidirectionally predictive-coded frame and said predictive-coded frame wherein, when at least three bidirectionally predictive-coded frames including the first and second bidirectionally predictive-coded frames are existent between said intra-coded frame and said predictive-coded frame, the motion in the bidirectionally predictive-coded frames other than the first is predicted from the preceding adjacent bidirectionally predictive-coded frame and said predictive-coded frame.

2. The interframe motion predictive method according to claim 1, wherein the motion in said second bidirectionally predictive-coded frame is predicted from at least one additional intra-coded frame.

3. A picture signal coding apparatus for orthogonally transforming a differential signal obtained from taking the difference between an input picture signal and a predictive-coded frame signal represented by block groups wherein each said block group consists of a plurality of individual blocks to generate transformed data, quantizing the transformed data to generate quantized data, and coding the quantized data to form picture dam, said apparatus comprising:

a local decoder for locally decoding said quantized data;

a first memory for storing decoded picture data obtained by locally decoding one of an intra-coded frame and a first bidirectionally predictive-coded frame;

a second memory for storing decoded picture data obtained by locally decoding a predictive-coded frame;

a predictive picture generator for generating a predictive picture of a second bidirectionally predictive-coded frame from the decoded picture data obtained by locally decoding said first bidirectionally predictive-coded frame and also from the decoded picture data obtained by locally decoding said predictive-coded frame; and a subtracter for calculating the difference between the predictive picture formed by said predictive picture generator and the input signal.

4. A picture signal coding apparatus for orthogonally transforming a differential signal obtained from taking the difference between an input picture signal and a predictive code frame signal represented by block groups wherein each said block group consists of a plurality of individual blocks to generate transformed data, quantizing the transformed data to generate quantized data, and coding the quantized data to form picture data, said apparatus comprising:

a local decoder for locally decoding said quantized data;

a first memory for storing decoded picture data obtained by locally decoding one of an intra-coded frame and a first bidirectionally predictive-coded frame;

a second memory for storing decoded picture data obtained by locally decoding a predictive-coded frame;

a third memory for storing decoded picture data obtained by locally decoding a second bidirectionally predictive-coded frame;

a predictive picture generator for generating a predictive picture of a third bidirectionally predictive-coded frame from the decoded picture data obtained by locally decoding the intra-coded frame, the decoded picture data obtained by locally decoding said second bidirectionally predictive-coded frame, and also from the decoded picture data obtained by locally decoding said predictive-coded frame; and a subtracter for calculating the difference between the predictive picture formed by said predictive picture generator and the input signal.

5. The picture signal coding apparatus according to claim 3, wherein said local decoder comprises an inverse quantizer for inversely quantizing said quantized data; and an inverse orthogonal transformer for executing an inverse orthogonal transformation of said inversely quantized data.

6. A picture signal decoding apparatus comprising:

an inverse multiplexer for separating coded data into interframe predictive error data and vector coded data;

a decoder for generating decoded picture data on the basis of said interframe predictive error data;

a first memory for storing decoded picture data of an intra-coded frame;

a second memory for storing decoded picture data of a predictive-coded frame;

a predictive picture generator for generating a predictive picture of a first bidirectionally predictive-coded frame from both decoded picture data of a second bidirectionally predictive-coded frame and the decoded picture data of the predictive-coded frame; and a frame switching selector for selectively rearranging the decoded picture data generated by the decoder, the decoded picture data stored in the first memory and the decoded picture data stored in the second memory in an order of reproduction and outputting the rearranged data.

7. A picture signal decoding apparatus comprising:

an inverse multiplexer for separating coded data into interframe predictive error data and vector coded data;

a decoder for generating decoded picture data on the basis of said interframe predictive error data;

a first memory for storing the decoded picture data of an intra-coded frame;

a second memory for storing the decoded picture data of a predictive-coded frame;

a third memory for storing the decoded picture data of a first bidirectionally predictive-coded frame generated from the decoded picture data of said intra-coded frame, the decoded picture data of a second bidirectionally predictive-coded frame, and the decoded picture data of said predictive-coded frame; and a frame switching selector for selectively rearranging the decoded picture data generated by the decoder, the decoded picture data stored in the first memory, the decoded picture stored in the second memory, and the decoded picture data stored in the third memory in an order of reproduction and outputting the rearranged data.

8. The picture signal decoding apparatus according to claim 6 or 7, wherein said decoder produces a predictive picture from the decoded picture data obtained by adding the interframe predictive error data to predictive picture data outputted from a predictive picture generator.

9. The picture signal coding apparatus according to claim 4, wherein said local decoder comprises an inverse quantizer for inversely quantizing said quantized data; and an inverse orthogonal transformer for executing an inverse orthogonal transformation of said inversely quantized data.

10. The picture signal decoding apparatus according to claim 7, wherein said decoder produces a predictive picture from the decoded picture data obtained by adding the interframe predictive error data to the predictive picture data outputted from said predictive picture generator.

* * * * *

UNITED STATES PATENT AND TRADEMARK OFFICE
CERTIFICATE OF CORRECTION

PATENT NO. : 5,386,234
DATED : January 31, 1995
INVENTOR(S) : Markus H. Veltman and Ryuichi Iwamura It is certified that error appears in the above-indentified patent and that said Letters Patent is hereby corrected as shown below:

At Col. 1, line 7, "35 U.S.C. S119" should be "35 U.S.C. §119"

At Col. 4, line 11, "frames a" should be --frames a are--

At Col. 4, line 22, "output-from" should be --output from--

At Col. 7, line 43, the word "dam" should be --data--.

Signed and Sealed this

Sixteenth Day of May, 1995

Attest:

BRUCE LEHMAN

Attesting Officer        Commissioner of Patents and Trademarks